(12) United States Patent
Fechner et al.

(10) Patent No.: US 7,048,627 B2
(45) Date of Patent: May 23, 2006

(54) MEASURING DEVICE FOR MEASURING HARVESTED CROP THROUGHPUT

(75) Inventors: Winfried Fechner, Cattau (DE); Wolfgang Busher, Roitzsch (DE); Jorg Gersonde, Kothen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/630,324

(22) Filed: Jul. 30, 2003

(65) Prior Publication Data

US 2005/0026662 A1 Feb. 3, 2005

(51) Int. Cl.
*A01F 12/52* (2006.01)
(52) U.S. Cl. .......................................... 460/4; 460/11
(58) Field of Classification Search ............. 56/10.2 C; 460/11, 12, 13, 6, 4
See application file for complete search history.

(56) References Cited

U.S. PATENT DOCUMENTS

| | | | | |
|---|---|---|---|---|
| 3,515,144 A | * | 6/1970 | Morrison | 460/4 |
| 3,630,209 A | * | 12/1971 | Metzger et al. | 460/13 |
| 4,441,511 A | * | 4/1984 | Schroeder | 460/13 |
| 5,015,997 A | * | 5/1991 | Strubbe | 340/684 |
| 5,351,558 A | | 10/1994 | Horn et al. | 73/861.08 |
| 5,369,603 A | | 11/1994 | Myers | 364/571.02 |
| 6,315,658 B1 | | 11/2001 | Weber | 460/6 |
| 6,342,006 B1 | * | 1/2002 | Bauch et al. | 460/4 |
| 6,524,183 B1 | * | 2/2003 | Van Quekelberghe | 460/4 |

FOREIGN PATENT DOCUMENTS

GB 1 203 134 8/1970

* cited by examiner

*Primary Examiner*—Meredith C. Petravick

(57) ABSTRACT

A measuring device for measuring harvested crop throughput is provided with a dosing device that adds additional grain to the flow of harvested crop material being processed to better calibrate the measuring device. The dosing device adds a defined amount of grain that can be detected by the measuring device.

4 Claims, 2 Drawing Sheets

MEASURING DEVICE FOR MEASURING HARVESTED CROP THROUGHPUT

FIELD OF THE INVENTION

The present invention is directed to a device for measuring harvested crop throughput in an agricultural harvesting machine, wherein a dosing device adds additional grain to the flow of harvested crop material to better calibrate the measuring device.

BACKGROUND OF THE INVENTION

Grain loss is a significant process factor when operating combine harvesters. Grain loss can be used in selecting travel speed and adjusting the parameters of the threshing process. However, it is difficult to precisely calculate grain loss from an operating combine harvester.

Devices for measuring grain loss are currently installed in almost all combine harvesters. However, their accuracy is deficient. There has been no satisfactory technical solution up to the present for a long-lasting and sufficiently accurate determination.

The known measuring devices for grain losses generally consist of several grain sensors that are arranged below the working parts such as threshing cylinders, straw walkers, sieves, etc., and that furnish signals when grain strikes. The more frequently the grain strikes, the higher the grain losses.

However, it cannot be precisely determined which portion of the grains that are collectively present in the crop flow is measured and how many grains furnish a direct electric impulse and which portion is not measured, since it does not initiate an electric impulse. The result can be additionally falsified by straw nodes, that also initiate electric impulses.

It has been determined that all previous solutions therefore contain the same system-conditioned measurement errors. The impulse frequency is a direct function only of the amount of grain in the lowest layer of the straw mat and is additionally influenced by changing harvesting conditions. What amount of grain is present in the layers above this lower layer cannot be determined. In the case of unfavorable separating conditions, the ratio between impulse-initiating grain and the total grain loss in the straw mat located above the impulse-initiating grain is smaller than under more favorable conditions. As long as the quantitative distribution of grain in the straw mat located above the impulse-initiating grain cannot be determined, no exact measurement of losses is given by the sensor systems measuring on the bottom of the straw mat. Arranging of sensors directly in the crop flow of the combine harvester and/or an identification of grain in the straw mat with physical measuring principles is not possible.

It appears obvious, e.g., to use several sensors for determining the characteristic separating line. However, the occurrence of the above-cited error in all sensors is again a disadvantage, so that the measuring accuracy could not be substantially increased. The quantitative distribution of grain and the straw mat continues to be unknown.

Measuring devices that detect the throughput of harvested crop and that have erroneous measured values are also located at other positions in harvesting machines, especially in combine harvesters. In order to reduce measuring errors U.S. Pat. No. 5,369,603 teaches calibrating an impact plate sensor with test runs in which the mass of the harvested grain tank content is measured by weighing. DE 195 41 177 A suggests measuring the crop flow continuously with a first measuring device. The crop flow is subsequently transported into a second measuring device whose measured value is used to calibrate the first measuring device. As defined by both publications a measured value is first detected with a first sensor and the measured value of the first sensor is subsequently calibrated with a second sensor. However, two sensors are required for this.

SUMMARY OF THE INVENTION

It is an object of the present invention to provide an improved measuring device for the precise determination of crop throughput.

The present invention makes this possible by introducing an additional supply of grain to the flow of crop material being processed upstream from the sensor. A dosing device introduces a defined amount of grain that has already been harvested and thus has the same material properties. This grain can bring about an undesired, greater loss of grain but makes it possible to determine the error of the sensors. The dosing can take place in a time-controlled manner at one or several points. The crop throughput can be mathematically exactly determined from the effect, e.g., of additional impulses on the sensors or a step response function, given a known added amount of grain.

The sensor is preferably arranged on the discharge side of a crop processing device that separates grain. Then the quantitative distribution of grain in the straw mat and therewith the grain losses can be totally calculated. The dosed supplying of additional grain into the grain separating process, which is defined locally and in time, yields clear conclusions about the quantitative distribution of grain in the straw mat. The precise determination of grain loss can be made therewith. However it is also conceivable that the sensor is a crop throughput sensor (in particular an impact plate or optical sensor) arranged, e.g., in a grain elevator. The changing of the measured value of the crop throughput sensor brought about by the addition of additional crop by the dosing device serves to calibrate the sensor.

As defined by the invention the influence of the various material properties of the harvested crops can be quantified and taken into consideration during the determination of the separating losses and of the degree of separation and/or of the regulating of all of the threshing and separating devices.

The supplying of the crop necessary for determination takes place via one or several grain dosing devices that are used in addition to the known sensors for grain losses.

This device doses a defined mass of harvested crop (grain) as an addition to the crop flow. As a consequence of supplying an additional, defined amount of crop, the signals that change thereupon can be better interpreted at the sensors and conclusions about the actual separating behavior of the threshing and separating devices can be better made than was previously the case. The amount of selected crop is a function of the throughput. It must on the one hand be sufficiently large in order to obtain a response signal. On the other hand the duration as well as the amount of the supply of mass should be held as small as possible in order to minimize impairing the separating process. The supply of crop with the aid of grain dosing devices can take place continuously, can be limited in time or can take place at regular intervals over the entire width of the threshing and separating devices or can be locally limited. The use of the grain dosing device can take place in combination with grain sensors at every point of the crop flow, e.g., in front of the threshing cylinder, the straw walker, sieves, etc.

The quantitative characterization creates new possibilities for automation in the combine harvester. The utilization of this improved information can be used by automation systems substantially improving their performance. The deficiency of previous solutions of not considering the quantitative distribution of grain during use under conditions of practice is eliminated by the purposeful external influencing of the separating process in order to achieve a process analysis in the combine harvester.

DETAILED DESCRIPTION

Figure 1:
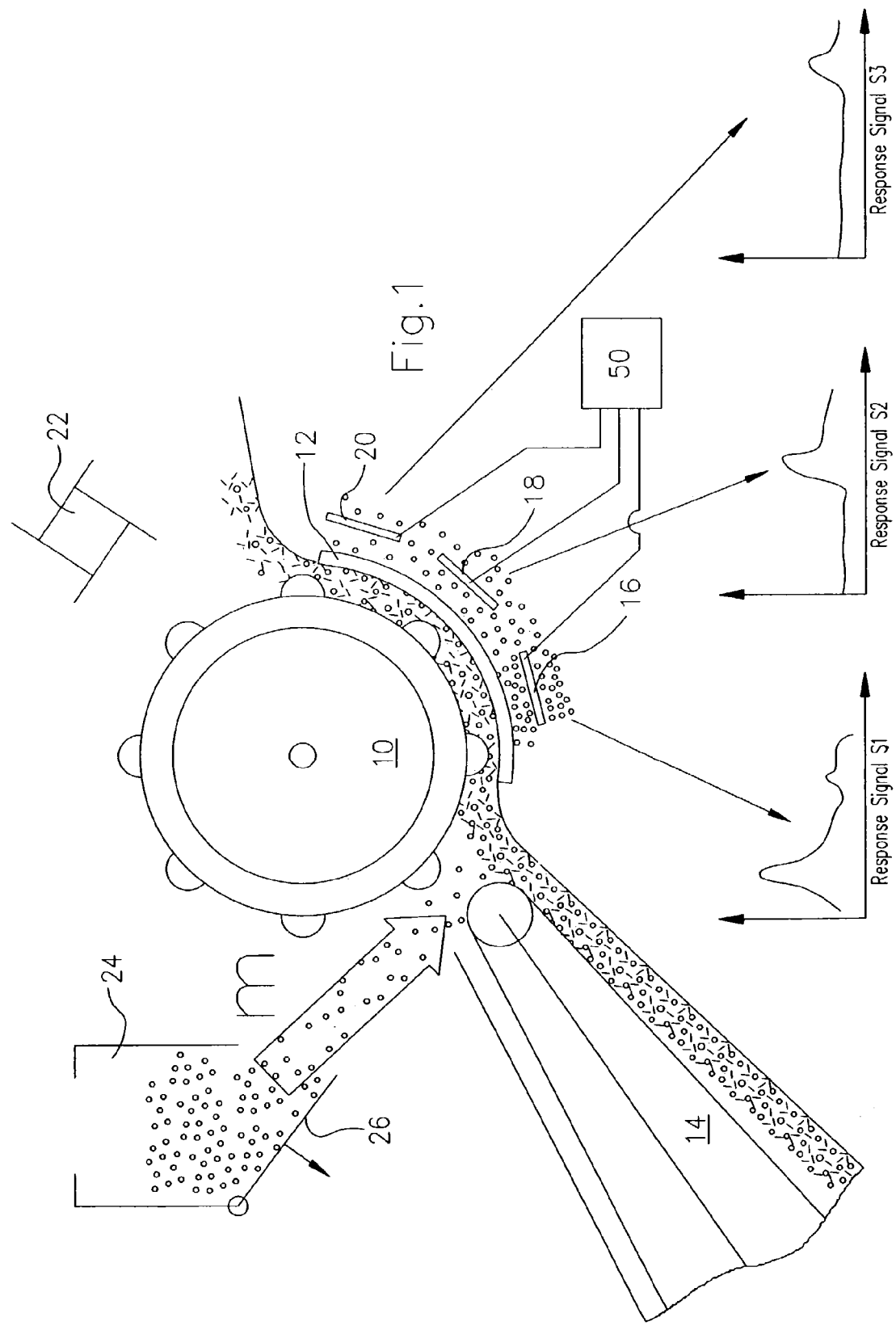
FIG. 1 shows a threshing device of a combine harvester with a measuring device in accordance with the invention.

FIG. 1 shows the threshing device of a combine harvester. It comprises a rotatabe threshing cylinder 10. Threshing concave 12 is arranged on a part of the circumference of threshing cylinder 10. Threshing cylinder 10 is supplied by feeder house 14 with a crop flow from a harvesting assembly. Threshing cylinder 10 is provided with rasp bars that in conjunction with the concave 12 threshes the crop and loosens grain, so that the grain falls down through openings in threshing concave 12. Three sensors 16, 18 and 20, which can be known impact plate sensors, are arranged in series below the threshing concave. Beater 22 is located downstream from the threshing cylinder 10 and directs the threshed crop to a separating device illustrated in FIG. 2.

Dosing device 24 is filled with grain supplied to it, e.g., by an appropriate line from the grain tank or the clean grain elevator of the combine harvester. Dosing device 24 is provided on the bottom with flap 26 that can be folded open. When flap 26 is opened, a defined amount of additional grain passes into the crop flow supplied to threshing cylinder 10. Sensors 16, 18 and 20 then furnish the signals shown in the lower part of FIG. 1. When grain is added from dosing device 24 a signal rise is obtained. A corrected throughput of grain in threshing cylinder 10 is calculated by an evaluation device 50 from the original signal and from the signal changed by the defined addition of grain.

Figure 2:
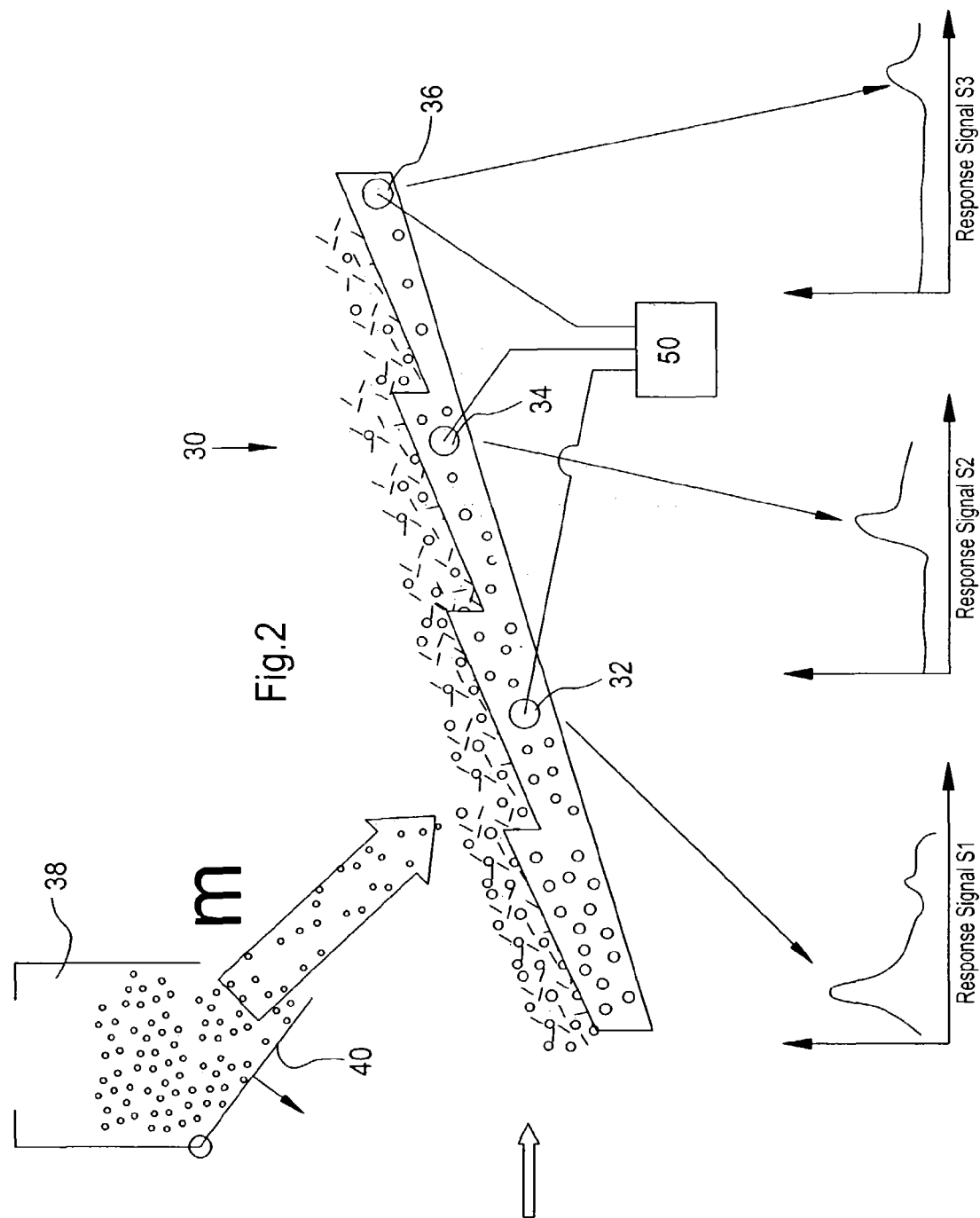
FIG. 2 shows a separating device of a combine harvester with a measuring device in accordance with the invention.

FIG. 2 shows the separating device of a combine harvester 10. It consists of a known straw walker 30. Three sensors 32, 34 and 36 with a known construction, e.g., impact plate sensors, are arranged below straw walker 30. They detect the amount of grain falling down from straw walker 30. A second dosing device 38 is filled with grain supplied to it, e.g., by an appropriate line from the grain tank or the clean grain elevator. Dosing device 38 is provided on the bottom with flap 40 that can be opened. When flap 40 is opened, a defined amount of additional grain passes into the crop flow supplied to straw shaker 30. Sensors 32, 34 and 36 then furnish the signals shown in the lower part of FIG. 2. When grain is added from dosing device 38, a signal rise is obtained. A corrected throughput of grain in straw walker 30 is calculated by the evaluation device 50 using the original signal and the signals changed by the defined addition of grain.

Such a dosing device can also be arranged at the inlet of a sieve with one or several sensors being located below the sieve for detecting the separated grain. Similar to the illustrated devices the sensor is/are connected to an evaluation device 50 designed in the manner described above. In all embodiments described the evaluation device 50 connected to the sensors can be connected to a display device that displays the grain throughput and/or the grain losses to the operator. The signals made available by the evaluation device 50 can also be used for automatically adjusting work parameters of the harvesting machine (e.g., travel speed, adjustment of the threshing cylinder, sieve apparatus opening and air blast velocity in the sieve) and/or for geo referenced yield mapping.

Having described the illustrated embodiment, it will become apparent that various modifications can be made without departing from the scope of the invention as defined in the accompanying claims.

The invention claimed is:

1. A measuring system for an agricultural harvesting machine having a crop processor for separating grain from a flow of crop material, the measuring system comprising:
    a dosing device for adding a defined amount of additional grain only to the crop material flowing into the crop processor;
    a grain sensor arranged at an output side of the crop processor so that separated grain impinges upon the sensor, the grain sensor generating a normal grain flow signal when the dosing device is inoperative, and the grain sensor generating an increased grain flow signal when the dosing device is adding grain to the crop material being processed by the crop processor; and
    an evaluation device connected to the grain sensor, the evaluation device calibrating the grain sensor as a function of the normal grain flow signal and the increased grain flow signal.

2. The measuring system of claim 1, wherein:
the crop processor is a threshing cylinder.

3. The measuring system of claim 1, wherein:
the crop processor is a straw walker.

4. The measuring system of claim 2, wherein:
a feeder house transports crop material to the threshing cylinder, the dosing device supplying grain to the feeder house.

* * * * *